United States Patent
Bae

(10) Patent No.: US 6,717,313 B1
(45) Date of Patent: Apr. 6, 2004

(54) MAGNETIC CIRCUIT FOR ROTATING APPARATUS

(75) Inventor: Youn Soo Bae, Kyunggi-do (KR)

(73) Assignee: Enertec Korea Co., LTD (KR)

( * ) Notice: Subject to any disclaimer, the term of this patent is extended or adjusted under 35 U.S.C. 154(b) by 0 days.

(21) Appl. No.: 09/700,604

(22) PCT Filed: May 17, 1999

(86) PCT No.: PCT/KR99/00246

§ 371 (c)(1),
(2), (4) Date: Nov. 15, 2000

(87) PCT Pub. No.: WO99/60692

PCT Pub. Date: Nov. 25, 1999

(30) Foreign Application Priority Data

May 16, 1998 (KR) ............................................. 98-17757

(51) Int. Cl.$^7$ ............................................... H02K 21/12
(52) U.S. Cl. ............................. 310/156.08; 310/156.32; 310/156.36; 310/254; 310/261; 310/156.02
(58) Field of Search ....................... 310/156.02, 156.08, 310/156.14, 156.15, 156.18, 156.32–156.37, 156.01, 254, 258, 259, 261, 268, 266

(56) References Cited

U.S. PATENT DOCUMENTS

| | | | | |
|---|---|---|---|---|
| 2,516,901 A | * | 8/1950 | Morrill | .................... 310/156.18 |
| 2,993,159 A | * | 7/1961 | Devol | .................... 310/156.36 |
| 2,994,023 A | * | 7/1961 | Devol | .......................... 318/138 |
| 3,745,388 A | * | 7/1973 | Frederick | .................. 310/49 R |
| 4,187,441 A | * | 2/1980 | Oney | .......................... 310/112 |
| 4,211,945 A | * | 7/1980 | Tawse | ............................. 310/1 |
| 4,371,801 A | * | 2/1983 | Richter | .................. 310/156.36 |
| 4,823,038 A | * | 4/1989 | Mizutani et al. | ............. 310/257 |
| 5,696,419 A | * | 12/1997 | Rakestraw et al. | ......... 310/156 |
| 5,973,436 A | * | 10/1999 | Mitcham | .................... 310/112 |
| 6,037,696 A | * | 3/2000 | Sromin et al. | .............. 310/268 |

* cited by examiner

*Primary Examiner*—Dang Le
(74) *Attorney, Agent, or Firm*—Harness, Dickey & Pierce, P.L.C.

(57) ABSTRACT

An energy conversion magnetic circuit is constituted with magnet pole pieces of magnets or armatures which are in parallel with respect to the shaft to obtain a dynamic force or an electromotive force. The magnetic circuit for a generator or an electric motor has a rotating shaft, a plurality of supporters fixedly mounted in a perpendicular direction to the circumference of the rotating shaft, a plurality of rotors arranged in parallel with respect to the shaft on each end of the plurality of supporters to be rotated by attraction force and repulsion force of a magnetic field, and a plurality of armatures having a coil wound on the body thereof. The coil is mounted at an interval outside the rotors and receives induced alternate magnetic flux of the rotors to generate a rectangular wave electromotive force or to obtain a high torque with input of electrical energy. The alternate magnetic flux generated when rotated, and magnet pole piece are arranged in parallel with the rotating shaft

6 Claims, 13 Drawing Sheets

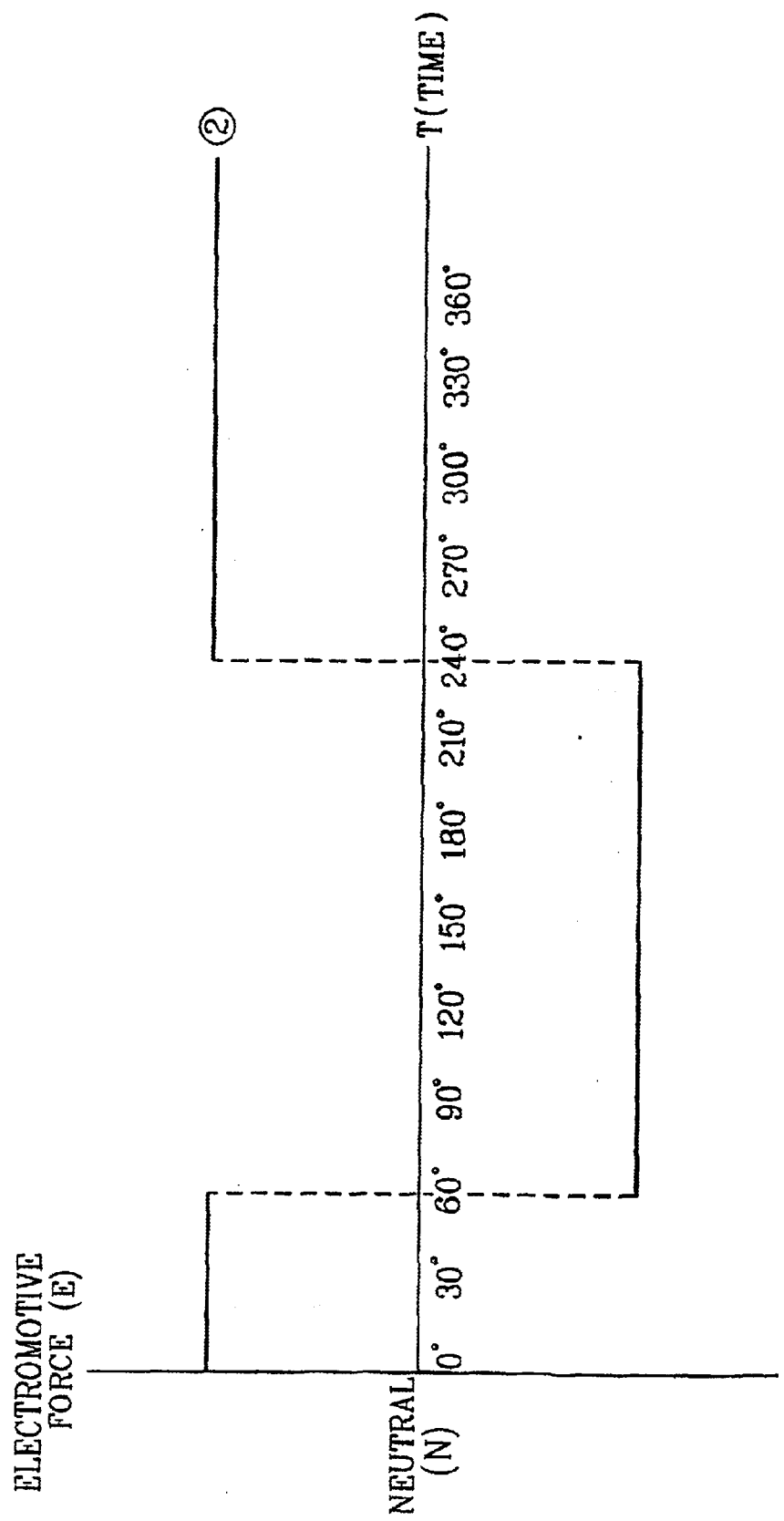

MAGNETIC CIRCUIT FOR ROTATING APPARATUS

BACKGROUND

1. Field of the Invention

The present invention relates to a magnetic circuit for energy conversion having a structure that magnets and magnet pole pieces (or planes) of an armature are dispose in parallel with respect to the shaft of an electric motor in order for a flux of a magnetic field to form a magnetic circuit in parallel with the shaft, to thereby obtain a dynamic force or a rectangular wave electromotive force.

2. Description of the Prior Art

A rotating apparatus and a power system, which are used so far, is structured vertically (at the right angle) when magnet 5 and magnet pole pieces (or planes) of an armature are traversely disposed (hereinafter, referred to as -with respect to a shaft-), so that a vertical type magnetic circuit is constructed which a flux of a magnetic field is circulated in directions of york 7, armature 6, magnet 5, armature 6, and magnet 5.

FIG. 1A is a schematic view of a conventional vertical type electric motor which has a magnetic flux in a vertical direction with respect to the motor shaft, FIG. 1B is a view for showing a flow of a magnetic field in the electric motor of FIG. 1A As shown in FIG. 1A, the conventional electric motor includes an annular stator 1 and a rotor 2 rotating in the annular stator 1. The annular stator 1 is constituted with an armature 6 and a york 7, and the rotor 2 has a shaft 3 and magnet 5.

FIG. 1B shows a different structure from FIG. 1A. That is, magnet 15 is formed on outside and an armature 16 is formed on inside to be rotated together with an armature 16.

Since magnetic circuits in FIGS. 1A and 1B, as shown in FIG. 1B, forms a flow of a magnetic flux vertically (at the right angle) with respect to the shaft when rotating, the magnetic circuits produces a rectangular wave in electromotive force signal system or generates a torque by means of a rectangular wave control input.

Further, as shown in FIG. 1A, in order for the magnet pole pieces of magnet 5 be formed in the vertical direction with respect to the shaft to be rotated, mechanical vibration of applied attraction and repulsion forces by means of the flow of a magnetic field is applied in the cross-sectional direction, to thereby apply much stress on the shaft.

Particulary, this phenomenon at a high speed increases load to the shaft. In order to solve the problem, strenuous exertion has been invested for the development of high strength material of excellent tensile toughness and for high precision machining technology so as to inevitably increase the production cost.

Further, the magnetic circuit in the conventional vertical circuit type electrical motor has another cost increase factor with respect to the maintenance fee and production cost because of a magnetic loss by a magnetic resistance according to multilevel flows of a magnetic field, an energy loss by iron core loss, etc., according to unnecessary material, and material loss by unnecessary magnetic circuit structures.

FIG. 2A is a view for showing a conventional three-phase full-wave rectifier circuit, FIG. 2B is a view for showing a voltage wave by a conventional three-phase generator, and FIG. 3C is a view for showing a rectified wave of a voltage wave generated by a conventional three-phase generator through the rectifier circuit of FIG. 2A.

As shown in FIG. 2A to FIG. 2C, rectification from an alternate current (AC) wave to a direct current(DC) wave (actually, a pulsating wave) requires a complex circuit including an Y-connection and diodes D1, D2, D3, D4, D5, and D6. Further, high precision filters are required in order to obtain an nearly complete direct current wave.

However, in actual, since it is difficult to obtain a complete DC current in a high voltage, the cost is increased in a system requiring a nearly complete high DC voltage with energy loss by various constituents used for obtaining a high and pure DC voltage.

SUMMARY OF THE INVENTION

In order to solve the above problems, it is a first object to provide a magnetic circuit for a rotating apparatus having magnet pole pieces(pianes) of a magnetic rotor or a static armature (structures such as magnetic stator and rotating armature are included) disposed in parallel with a shaft (when the shaft is traversely disposed) as a magnetic circuit for a magnetic flux of magnet side to be circulated in the traverse(parallel) direction, to thereby obtain a high torque rotation force by a highly efficient rectangular electromotive force according to a mechanical rotation force and by a rectangular wave control electric power according to an electric energy.

It is a second object to provide a magnetic circuit for a rotating apparatus having a propeller mounted on a supporter connecting a shaft and a rotor with pole pieces disposed in parallel with respect to the shaft, to thereby obtain a propulsion force by using an air convection phenomenon appearing upon the rotation of the propeller or a rectangular wave electromotive force by -wind force- which is a mechanical propulsion force.

It is a third object to provide a magnetic circuit for a rotating apparatus having a wave washer between the shaft and bearings so that mechanical vibrations appearing in parallel with the shaft are absorbed and the mechanical vibrantions apprearing by the operation of attraction and repulsion forces applied perpendicularly to the shaft are minimal compared to other device, thereby obtaining a high speed rotation force.

It is a fourth object to provide a magnetic circuit for a rotating apparatus having a matrix-structured magnetic circuit providing a twist angle to magnets and rotors so that a spiral flow of a magnetic field flux is derived to reduce a reaction force of an armature occurring upon generation of an electromotive force and a high speed rotating force is obtained upon generation of a mechanical dynamic force.

It is a fifth object to provide a magnetic circuit for a rotating apparatus having a compound structure of multi-layers of magnets and armatures on the same shaft wherein one layer is used as an exciter and another layer is used as a rotor or a synchronous machine.

It is a sixth object to provide a magnetic circuit for a rotating apparatus with a flow of a magnetic field circulated traversely (in parallel) in directions of magnet, armature and magnet with respect to the shaft, thus capable of reducing material loss by eliminating a york which connects armatures or magnets.

It is a seventh object to provide a magnetic circuit for a rotating apparatus having a magnetic resistance of a slit between armatures(phases) and magnets in order for a flux of a magnetic field not to be circulated between the armatures and magnets, so that a magnetic field flux in magnets is guided to be magnetically circulated along an armature to a neighboring magnets, to thereby obtain a rectangular wave of an electromotive force occurring according to interlinkage of magnetic field flux circulated in coils of an armature.

BRIEF DESCRIPTION OF THE DRAWINGS

The above and other objects of the present invention will become readily apparent by reference to the following detailed description when considered in conjunction with the accompanying drawings wherein:

FIGS. 4B, 4C, 4D, and 4E show electromotive force waveformns of a 3-phase generator according to one emnbodiment of the present invention;

DETAILED DESCRIPTION OF A PREFERRED EMBODIMENT

Figure 1A:
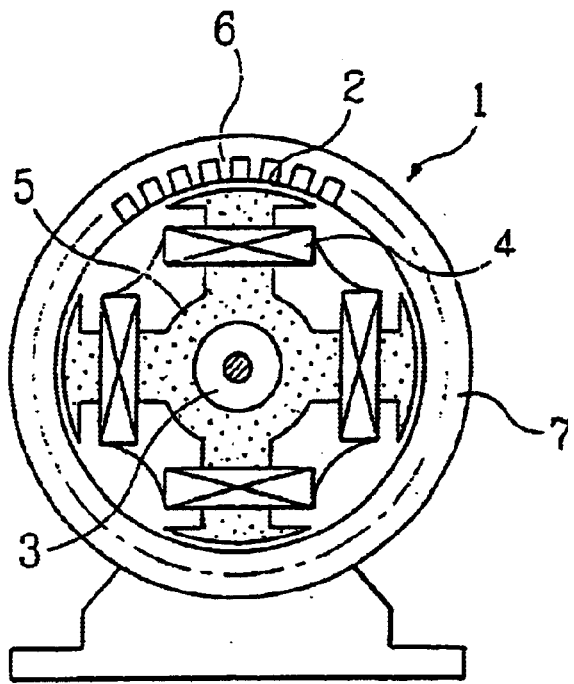
FIG. 1A is a schematic view of a conventional vertical type electric motor and synchronous machine which has a magnetic flux in a vertical direction with respect to the motor shaft.
Figure 1B:
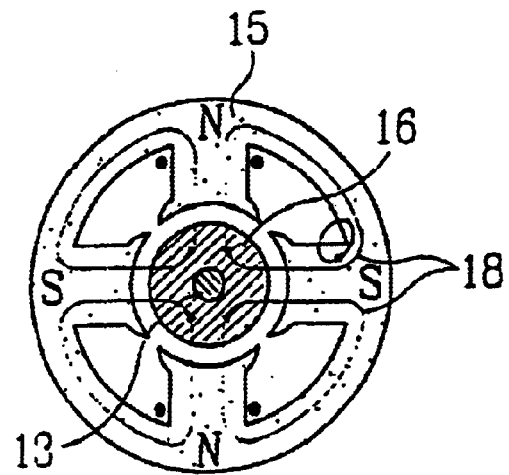
FIG. 1B is a view for showing a flow of a magnetic field in the electric motor of FIG. 1A.
Figure 2A:
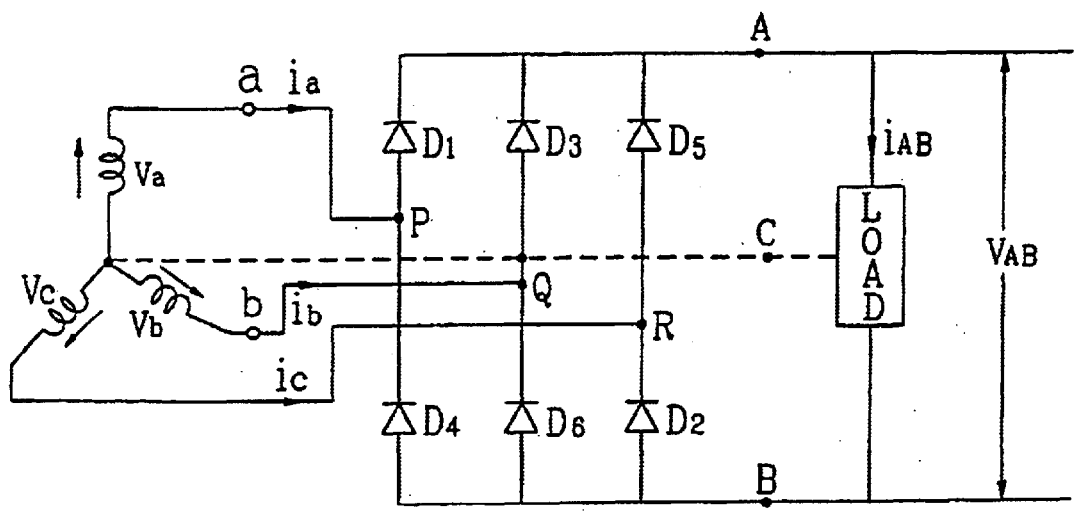
FIG. 2A is a view for showing a conventional 3-phase full wave rectifying circuit.
Figure 2B:
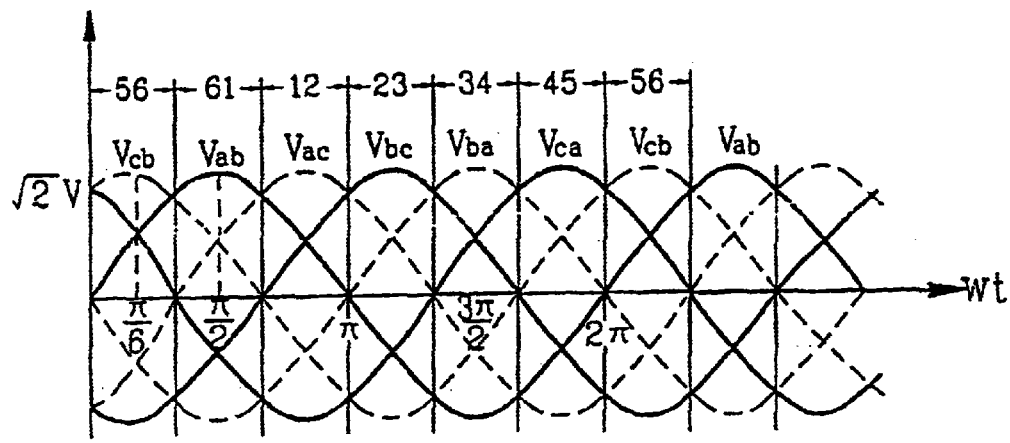
FIG. 2B is a view for showing a voltage waveform by a conventional 3-phase generator.
Figure 2C:
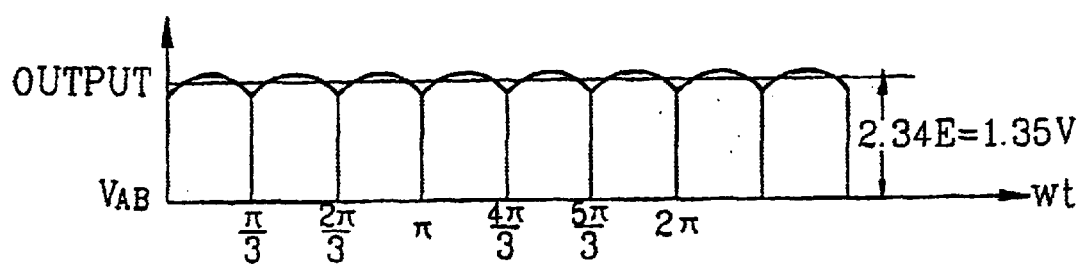
FIG. 2C shows a full-wave rectified waveform of a voltage waveformn of a conventional 3-phase generator.

According to one embodiment of the present invention, a magnetic circuit for a rotating apparatus which is employed for a rectangular wave generator or a rectangular wave electric motor includes a rotating shaft, a plurality of supporters fixedly mounted perpendicularly to the rotating shaft, a plurality of rotors each mounted to each end of the plurality of supporters in order for pole pieces(faces) to be parallel with the rotating shaft so that the rotors are rotated by an attraction force and a repulsion force of a magnetic field, and a plurality of stators (armatures) mounted in a certain interval to each other and each having a coil on their body to obtain alternate magnetic field flux from the pole pieces(faces) of the rotors (magnets) occurring upon rotation of the rotors.

Further, according to a preferred characteristic of the present invention, a rectangular wave electric power generator, a annular magnetic field flux deriver, and a mechanical dynamic power generator, a phase angle detector, and a position detector are included. The rectangular wave electric power generator has C-type, U-type, and I-type or twist-structured C-type, U-type, and I-type armatures for derivation of an alternate magnetic field flux (or magnetic flux) of a magnet generated upon rotation. A york that is a magnetically circulating medium between armatures and magnets is eliminated to generate a rectangular wave electromotive force and a rectangular wave signal according to discontinuous flow of magnetic field flux by a magnetic resistance.

According to a preferred characteristic of the present invention, the annular magnetic field flux deriver has an armature and magnet. The bodies of the armature and magnet have skew-structured twist angles so that a flow of a magnetic flux upon rotation is formed annually.

The mechanical dynamic power generator has a plurality of armatures and a plurality of magnets so that rotors are rotated by a rectangular wave alternate magnetic flux generated by electric energy. The rotors are disposed in raw with respect to the shaft so that parallel driving is enabled according to a required torque quantity.

The phase angle detector and the position detector obtain phase angles and position information according to a quantity change of a rectangular wave electromotive force by means of a different winding number of coil mounted on an armature at a necessary position.

As another preferred characteristic of the present invention, a magnetic circuit of complex functions for a rotating apparatus. The magnetic circuit has the multilayer of magnets and armatures on one shaft, some layers are used for rotors, some are used for synchronous machines or rectangular wave generators, and the other are used for exciters which excites magnet.

According to another preferred characteristic of the present invention, a magnetic circuit for a rotating apparatus having a DC electric power generator is further provided. In the DC electric power generator, rectangular wave electric powers from a plurality of armatures are connected in a single phase-type manner to produce a DC electric power.

Figure 3:
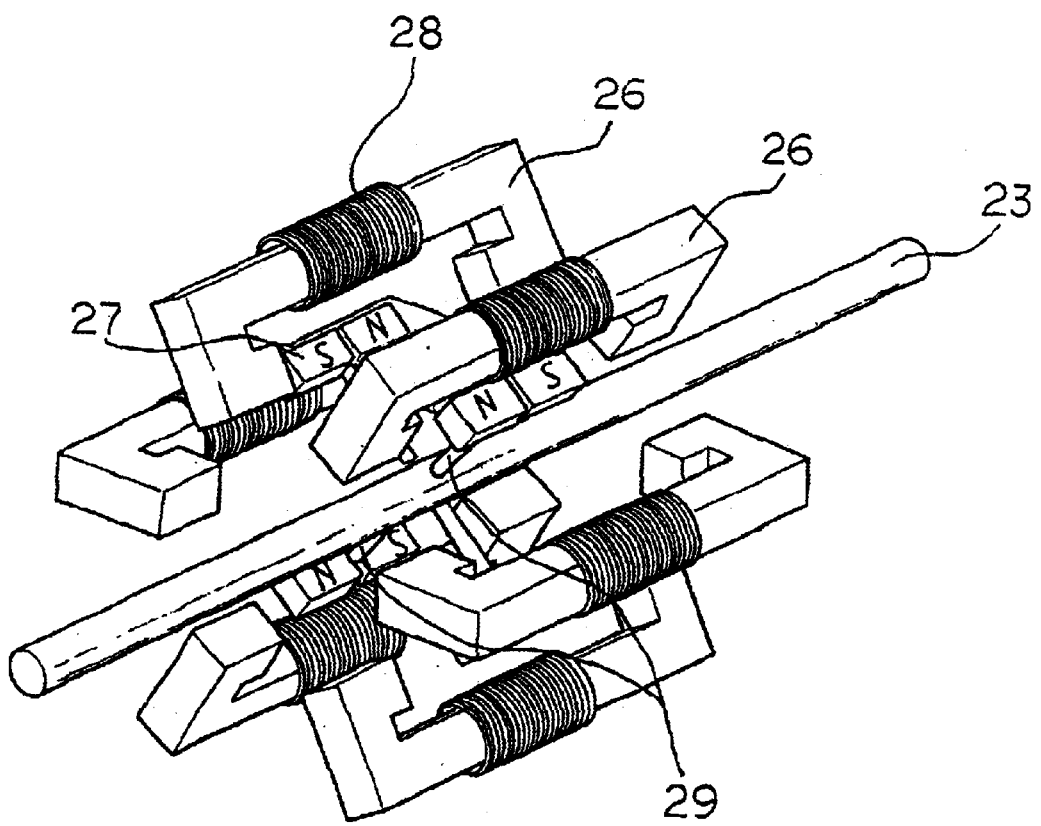
FIG. 3 is a schematic perspective view of a 4-pole 3-phase generator according to one embodiment of the present invention.

As shown in FIG. 3, rotors 27 are fixed to supporters 29, and pole pieces of the rotors 27 are mounted in parallel with respect to the shaft 23. Further, coils 28 is mounted on the stators 26 to be opposite to pole pieces(faces) with respect to the shaft 23.

In the embodiment of the present invention, a 4-pole 3-phase rotor is, for possible convenience, shown for description of a rotating operation.

Accordingly, stators 26 are disposed in interval of 60 degree, so there are six stators 26. Even though there is not shown here, these stators 26 are fixed by the housing. Rotors 27 are disposed in interval of 90 degree and mounted on one ends of supporters 29 fixed to the shaft 23. The polarity of one rotor has an opposite polarity or the same polarity (not shown) to the neighboring rotor as shown in FIG. 3.

The number and polarity of the stators 26 and rotors 27 may be changed.

Further, a propeller(not shown) may be mounted on a supporter which connects the shaft 23 and the rotor 27 or between the shaft 23 and the rotor 27, so that propulsion force is obtained from air convection phenomenon generated by the rotation of the rotors 27.

Figure 4A:
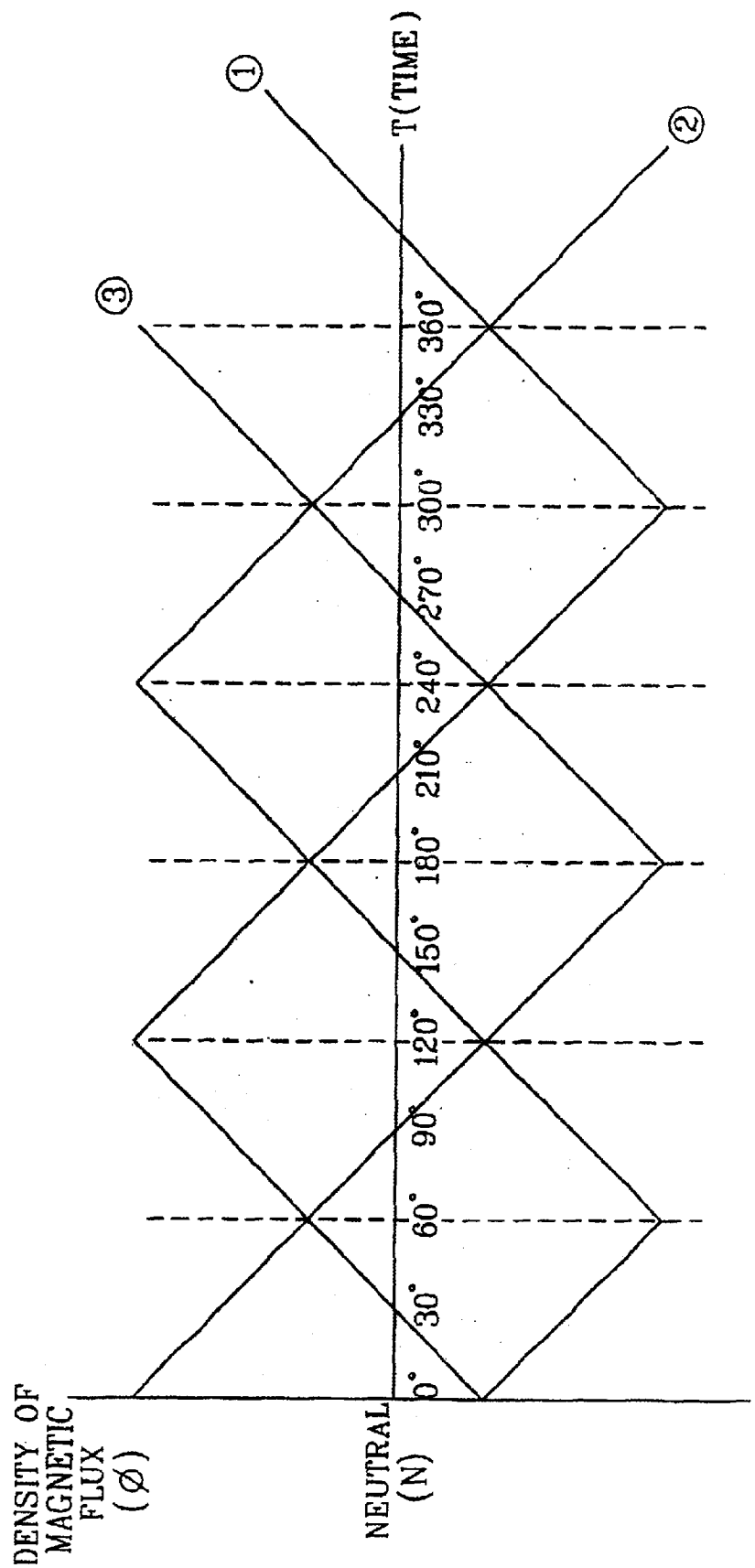
FIG. 4A shows a waveform of a magnetic field of 4-pole 3-phase generator according to one embodiment of the present invention.
Figure 4B:
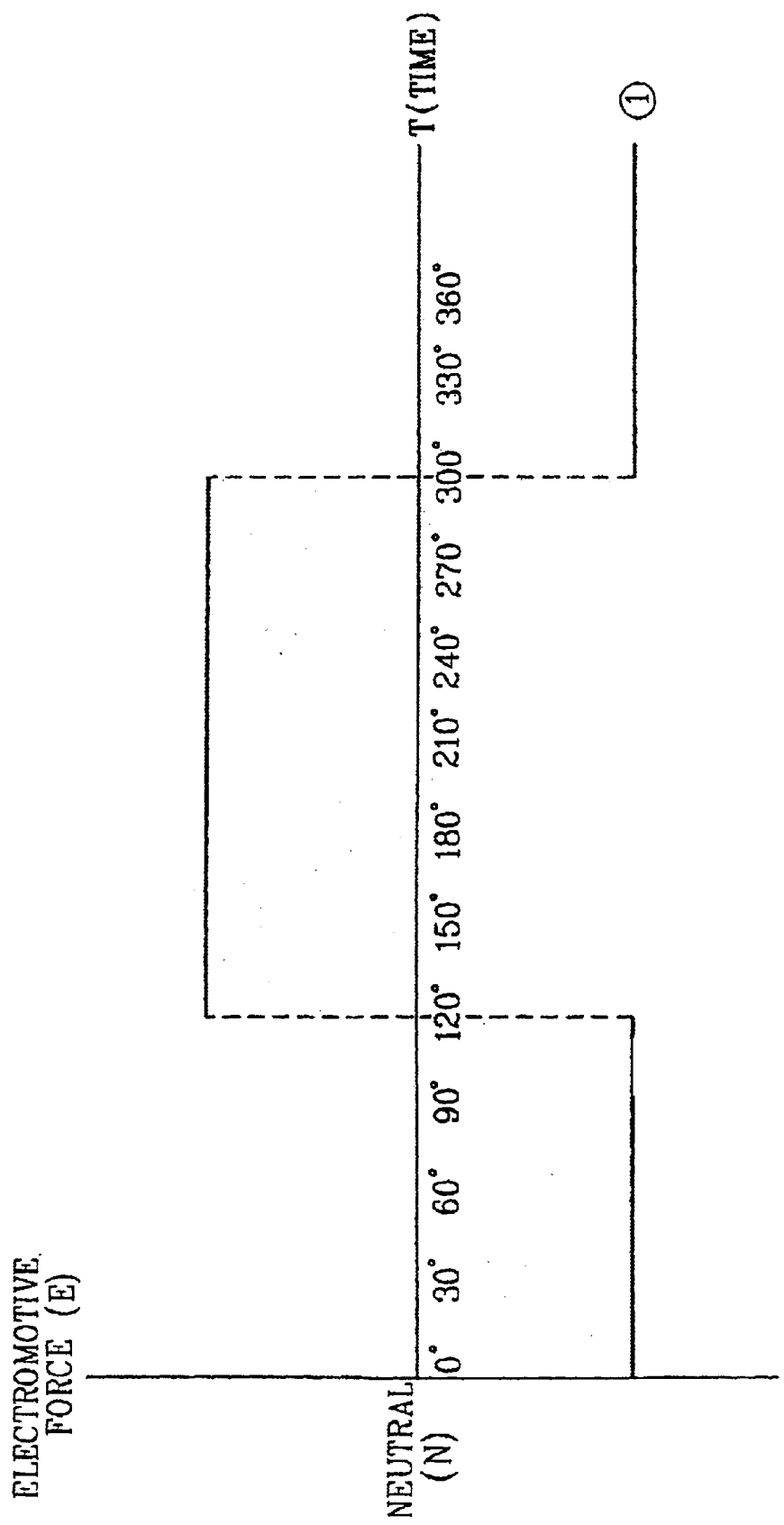
Figure 4D:
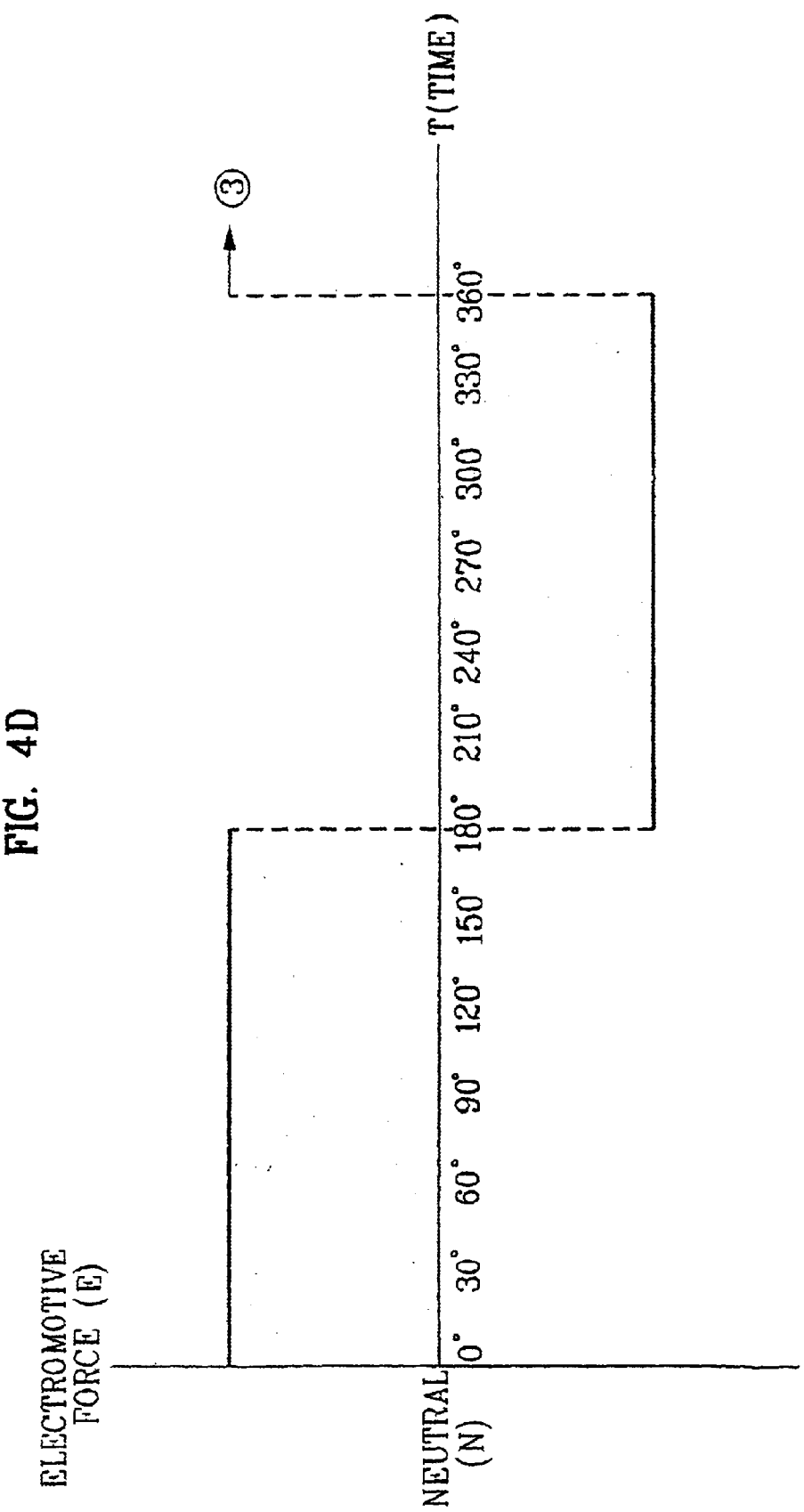

In the rectangular wave generator(not shown) according to the embodiment of the present invention, as the shaft 23 is rotated by an external dynamic power, a magnetic rotor generates triangle wave magnetic flux. The triangle wave magnetic flux is induced to an armature to generate a rectangular waves as shown in FIGS. 4B, 4C, and 4D to winding coils. The triangle waves are generated by a matrix-structured magnetic circuit and current controls of the field in the apparatus according to the embodiment of the present invention.

Figure 4E:
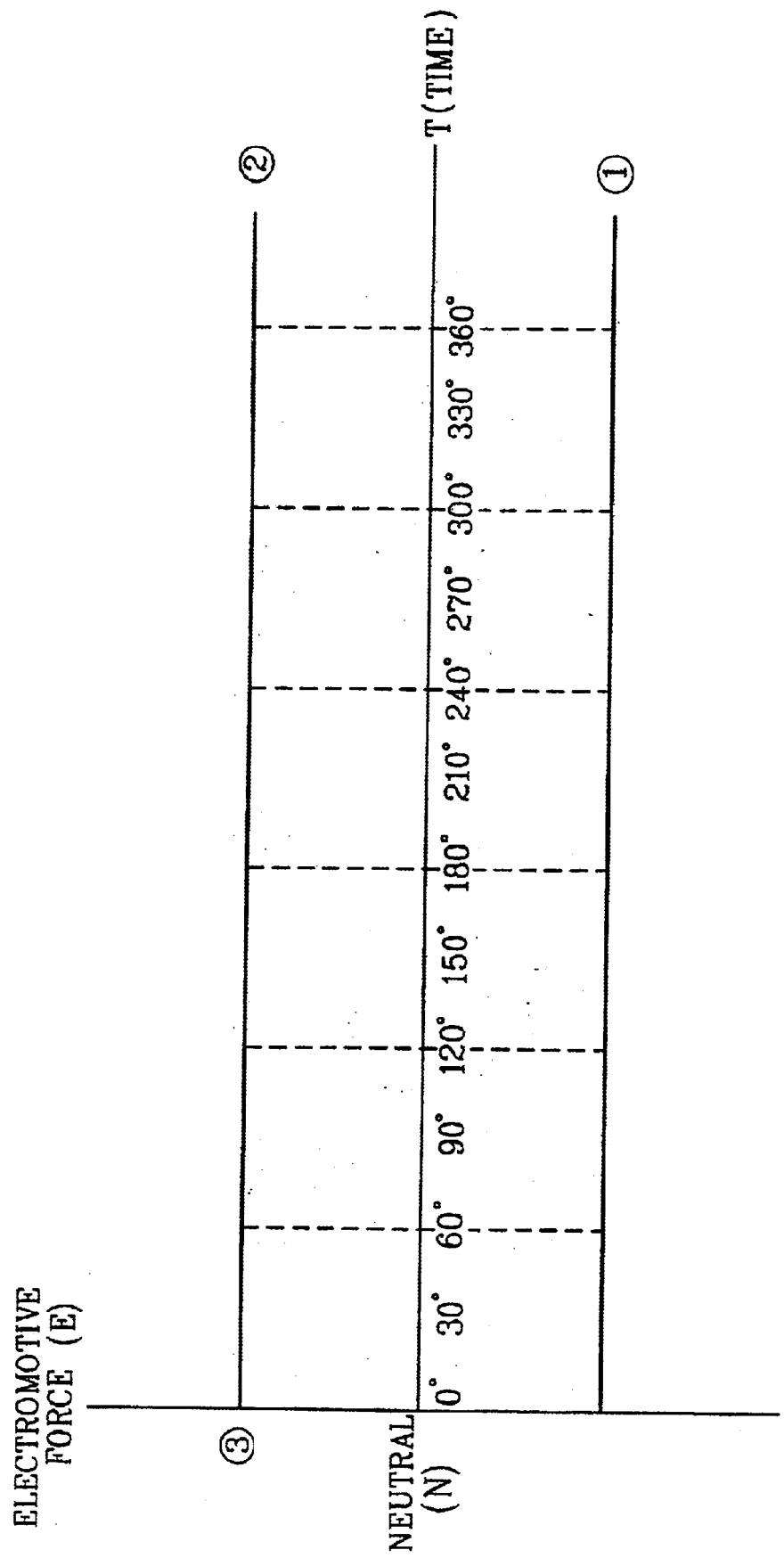

FIG. 4E is a view for showing a conversion to a DC electric power by composite waves of FIGS. 4B, 4C, and 4D.

Further, sinusoidal waves are made by a phase interval and field structure.

Figure 5A:
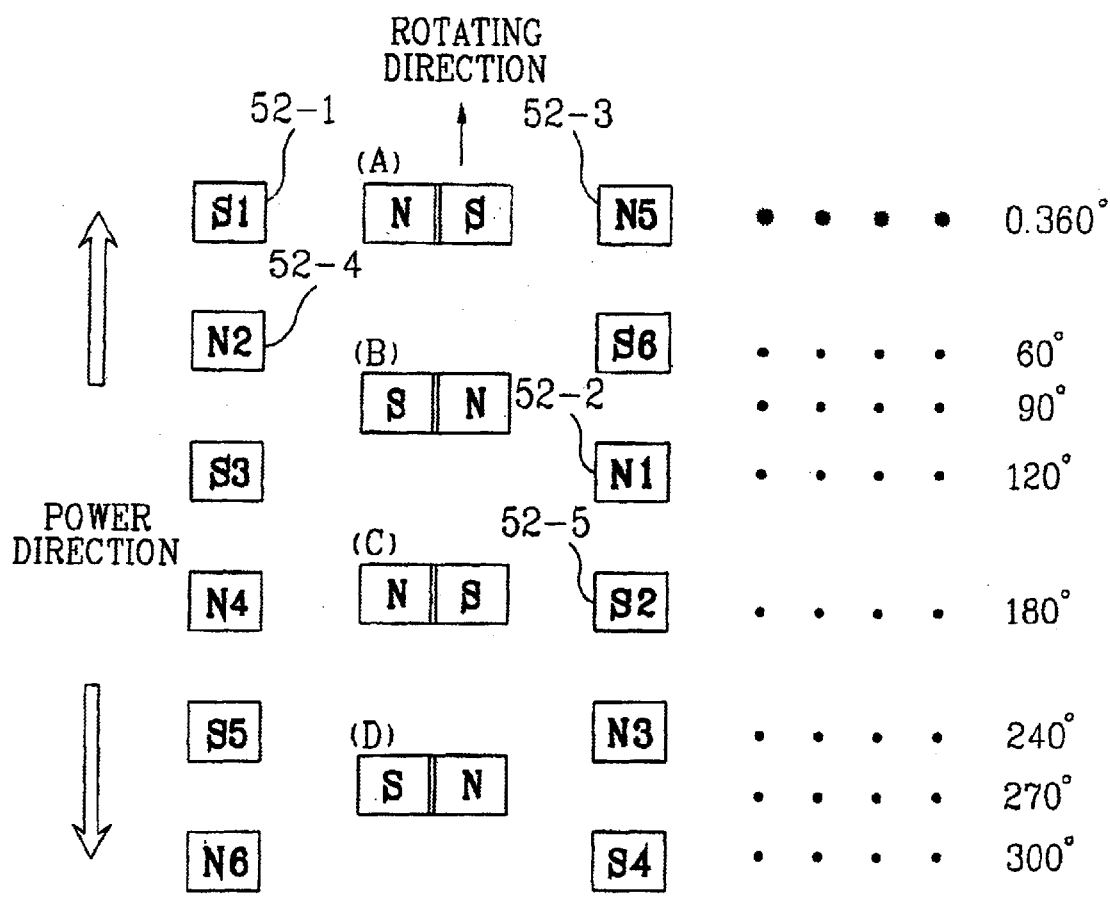
FIGS. 5A and 5B load state views of a generator according to one embodiment of the present invention.
Figure 5B:
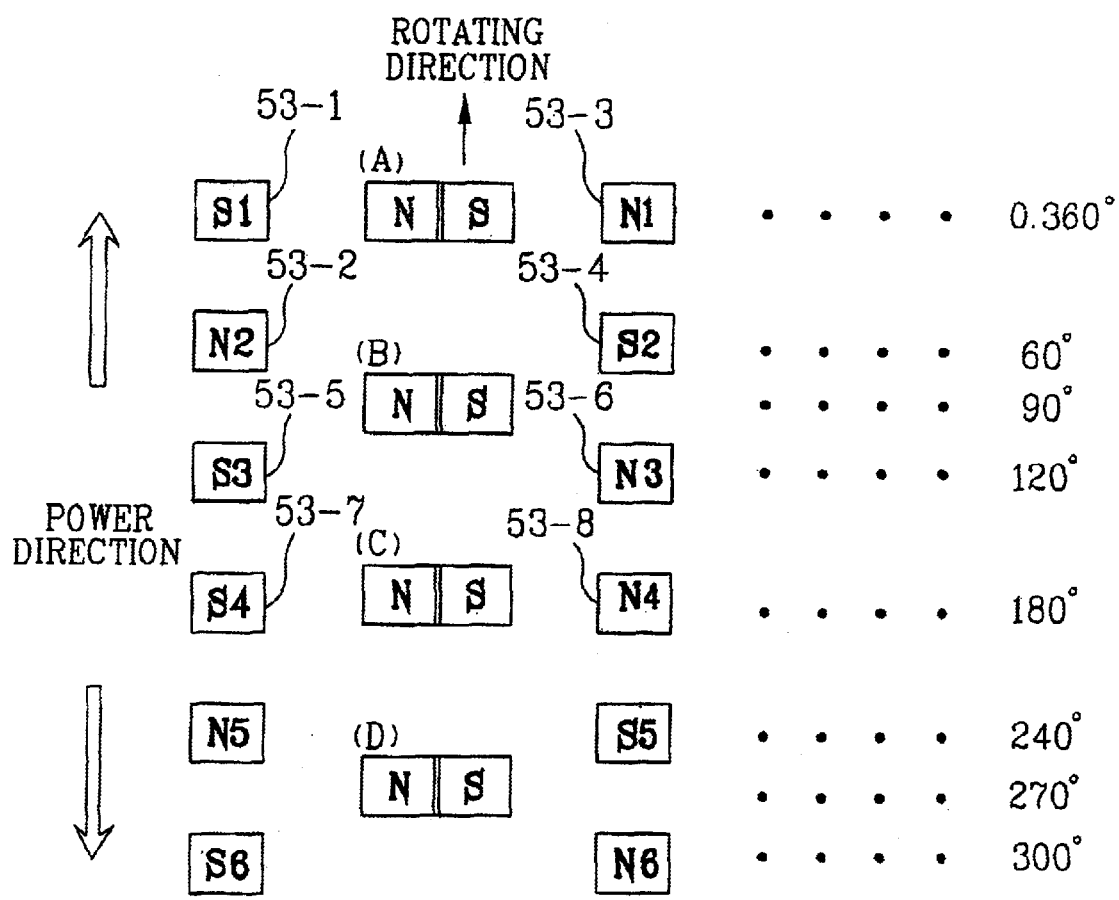

FIGS. 5A and 5B are views for showing a load state of a generator according to an embodiment of the present invention.

As shown in FIG. 5A, when described with 4-pole 3-phase, as given from a magnet (A) to a magnet (D), armatures 52-1 and 52-2 of one body in a twisted structure does not show any polarity as any load is not applied, but show an induced opposite polarity to a magnetic flux as load is applied, according to the Lenz law.

However, according to the embodiment of the present invention, as the above magnet state, that is, as given from the magnet (A) to the magnet (D), is rotated in an arrow direction denoted above the magnet (A) by an external dynamic force and the magnet (A) escapes from magnet pole pieces(face) 52-1 and 52-3, a magnet polarity S1 is induced in the magnet pole piece(face) 52-1 of the armature and a magnet polarity N1 is induced in the magnet pole piece (face) 52-2 of the armature of a twist structure. Therefore, the rotation of the magnet (A) is interrupted and the rotation of the magnet (B) is promoted in the rotation direction.

By such operation, the action and reaction of an armature occur together, which is a characteristic factor of the present invention that can not be obtained in the conventional generator.

At this time, the magnets are arranged at the right angle or at a different angle if necessary.

In FIG. 5B, the magnets are arranged in the same polarity and armatures are arranged side by side with respect to the magnets. As rotated in the arrow direction denoted over the magnet (A) by load of an external dynamic force, a magnetic polarity S1 is induced on the magnet pole piece(face) of an armature 53-1 when the magnet (A) gets out of magnet pole pieces(faces) of armatures 53-1 and 53-3, and the magnet pole piece (faces) of armature 53-3 of the body by the same arrangement structure is induced to a magnetic polarity N1, so that the magnet (A) is drawn back for the rotation to be interrupted and the magnet (B) is also interrupted in its progress by the magnet pole pieces(faces) of other armatures 53-2 and 53-4. However, the purpose of the magnetic circuit of FIG. 5B is for obtaining an on-off signal so that much energy is not consumed.

Figure 6:
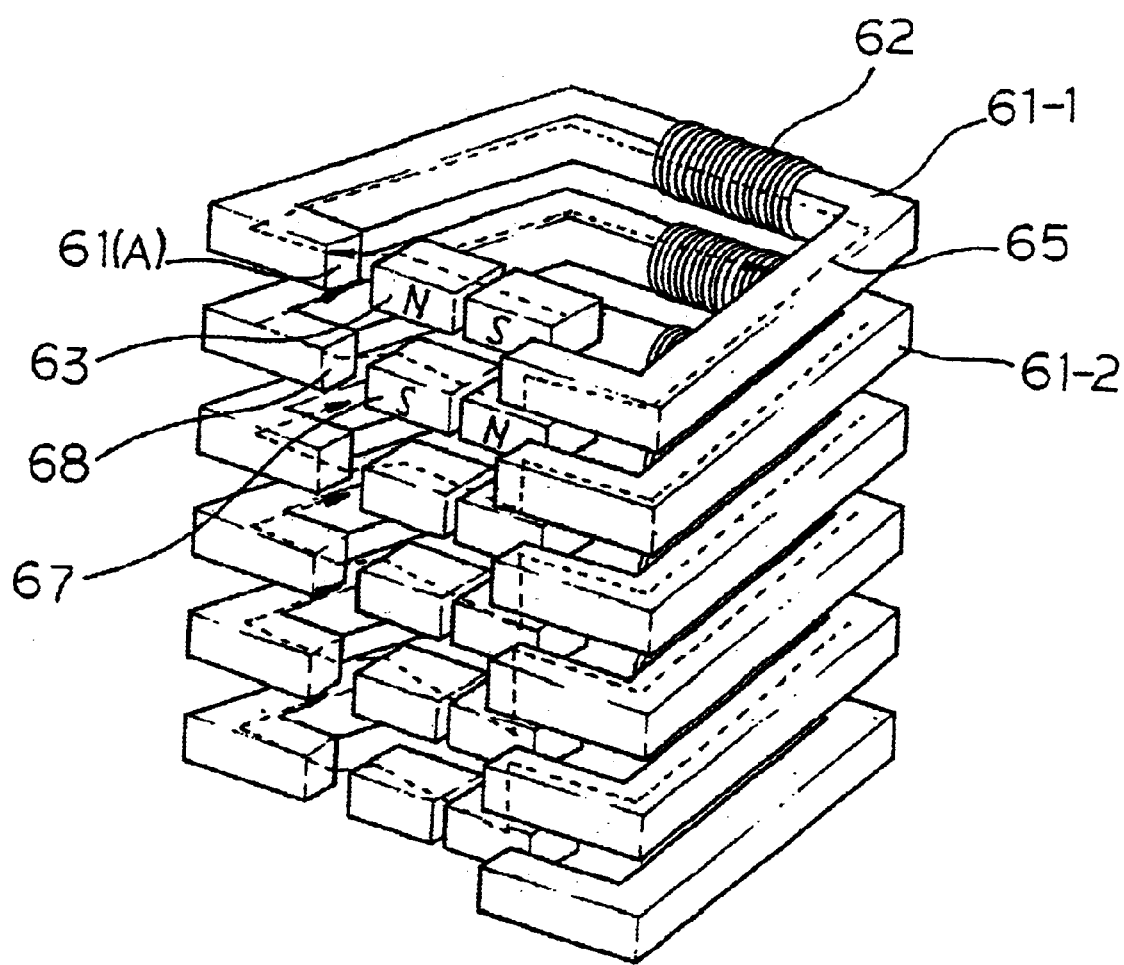
FIG. 6 is a view for showing a magnetic flow of a single phase motor according to another embodiment of the present invention.
Figure 7:
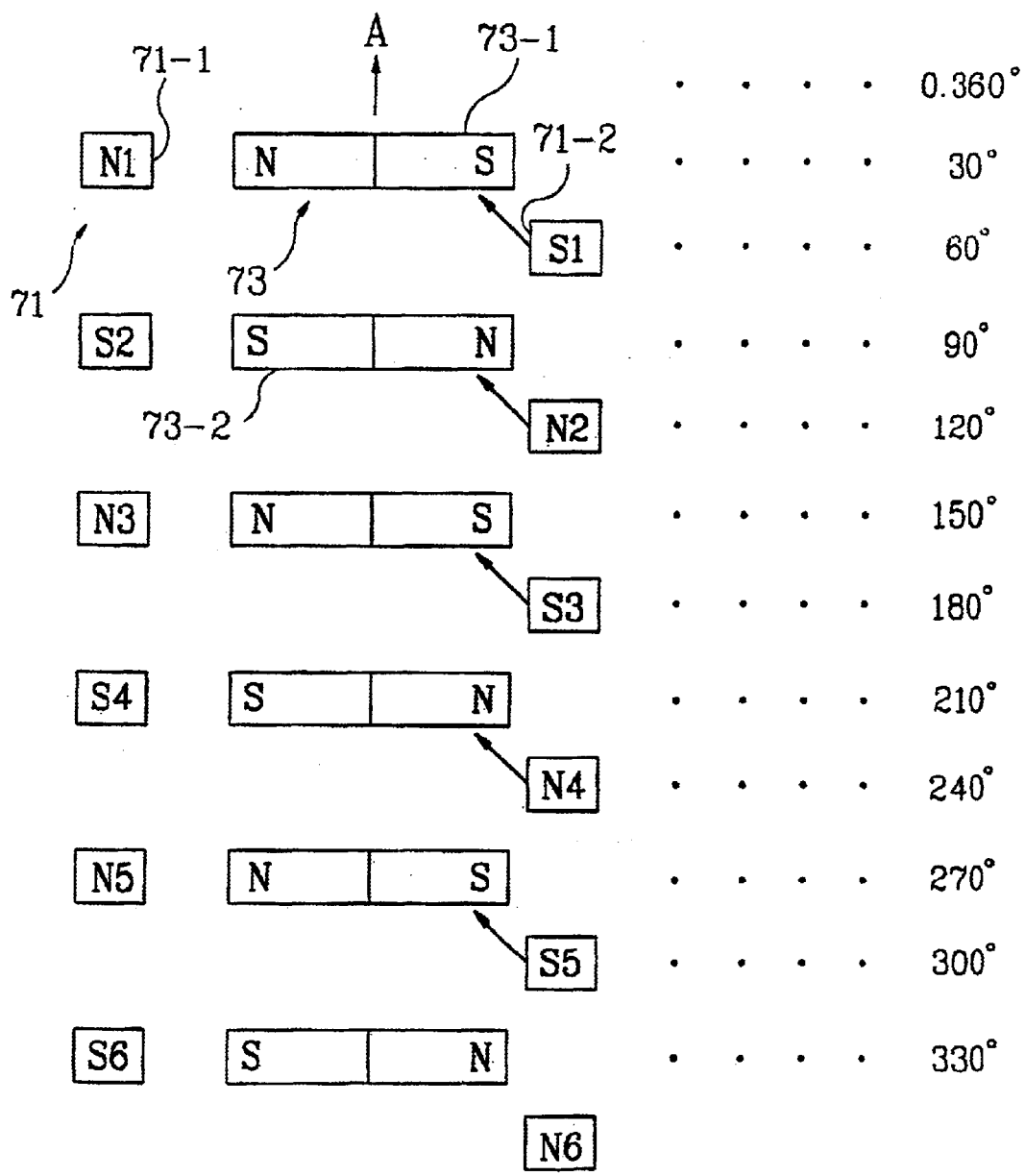
FIG. 7 is an explanatory view of operations of a single phase motor according to another embodiment of the present invention.

FIG. 6 is a view for explaining a flow of a magnetic field when operated as an electric motor by applying current to a coil of a stator in a single phase motor having six rotors in interval of 60 degree in a digital generator of FIG. 3, and FIG. 7 is a view for explaining operations of FIG. 6.

Accordingly, a spiral flow of a magnetic field is shown with a structure having a supporter and a rotor further mounted in interval of 60 degree from the structure of FIG. 3.

Stators with coils wound and a rotors 63 are shown in FIG. 6, and, in FIG. 7, magnet pole pieces(faces) of stators 71-1 and 71-2 as an integral stator 71 has a skew angle to induce a spiral flux of a magnetic field, so that a rotating force of a rotor 73 is smoothly generated.

That is, a magnetic flux of a rotating magnet 63 passes through a slit to be induced on a magnet pole piece 61A of a static armature, and the induced magnetic flux 65 moves along another static armature 68 up to another rotating magnet 67. With this operation repeated, a rotating force by a spiral flux of a magnetic field is generated.

The apparatus according to the present invention has the following effects through some embodiments.

That is, as applied to a generator, since an electromotive force wave is a rectangular wave, a DC conversion characteristic is excellent, material loss is small since only necessary material is machined with less redundancy of a magnetic circuit The minimization of the material loss brings the minimization of iron core loss and magnetic resistance to reduce energy loss.

Further, since the action and reaction is simultaneously applied when loaded, the minimization of a mechanical energy is achieved and a conversion loss from AC to DC can be minimized.

In the meantime, as applied to an electric motor, since the rotation movement is that attraction force and repulsion force is applied in parallel with respect to the shaft, it is easy to absorb a vibration wave by a mechanical vibration so that a high speed rotation can be obtain, and since a skew space arrangement and a twist angle are easily obtained, calking torque can be reduced greatly.

What is claimed is:

1. A magnetic circuit for a rotating apparatus having a parallel structure or a skew structure of magnet pole pieces of magnets or armatures with respect to a shaft, comprising:

a rotating shaft;

a plurality of supporters fixedly mounted in a perpendicular direction to the circumference of the rotating shaft;

a rotor having a plurality of magnets rotated by attraction force and repulsion force of a magnetic field, each magnet having a magnet pole piece being arranged in parallel with respect to the shaft and located on an end of one of the plurality of supporters; and a plurality of armatures (stators) each having a coil and opposing pole faces, each coil being mounted at an interval outside the rotors and receiving induced magnetic flux of the rotors, and said coil pole faces being arranged in skew with the rotating shaft.

2. The magnetic circuit for a rotating apparatus as claimed in claim 1, wherein the rotors have the parallel structure or the skew structure of the magnet pole pieces of the magnets with respect to the shaft so as to be rotated by a force of a magnetic field in a parallel direction with the rotating shaft.

3. The magnetic circuit for a rotating apparatus as claimed in claim 1, wherein the armatures.

4. The magnetic circuit for a rotating apparatus of claim 3 wherein the magnet pole pieces of the magnet are parallel with respect to the shaft and the rotors being rotated by a force of a magnetic field formed in the parallel direction with the rotating shaft and thus minimizing the lateral vibration of the shaft under rotation.

5. An electrical apparatus comprising:

a shaft having an axial direction and a radial direction;

a plurality of supports extending radially from the shaft;

ends of each support having a pair of magnets mounted thereto, each pair containing magnets of opposite polarity, each magnet having pole faces extending parallel to the axial direction of the shaft;

a plurality of arcuate stators surrounding the shaft each stator having a leg with a coil attached thereto and ends that mutually face each other to define a gap through which the pairs of magnets rotate; and adjacent magnet pairs having magnetic polarities which are reversed with respect to each other.

6. A magnetic circuit for a rotating apparatus having a parallel structure of magnet pole pieces of magnets or armatures with respect to a shaft, comprising:

a rotating shaft;

a plurality of supporters fixedly mounted in a perpendicular direction to the circumference of the rotating shaft;

a rotor having a plurality of magnets rotated by attraction force and repulsion force of a magnetic field, each magnet having a magnet pole piece being arranged in parallel with respect to the shaft and located on an end of one of the plurality of supporters; and a plurality of armatures (stators) each having a coil, each coil being mounted at an interval outside the rotors and receiving induced magnetic flux of the rotors, and said magnet pole pieces being arranged in parallel with the rotating shaft;

wherein said armatures are C-shaped to minimize the lateral vibration of the shaft under rotation.

* * * * *